US006546728B2

(12) United States Patent
Schmidt et al.

(10) Patent No.: US 6,546,728 B2
(45) Date of Patent: Apr. 15, 2003

(54) EXHAUST-GAS TURBOCHARGER FOR AN INTERNAL COMBUSTION ENGINE AND METHOD OF OPERATING AN EXHAUST-GAS TURBOCHARGER

(75) Inventors: Erwin Schmidt, Baltmannsweiler (DE); Siegfried Sumser, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/910,005

(22) Filed: Jul. 23, 2001

(65) Prior Publication Data
US 2002/0023438 A1 Feb. 28, 2002

(30) Foreign Application Priority Data
Jul. 22, 2000 (DE) .......................... 100 35 762

(51) Int. Cl.⁷ ............................ F02D 23/00
(52) U.S. Cl. .................. 60/602; 415/150; 415/159; 415/163; 415/164
(58) Field of Search .............. 60/602, 603, 611; 415/159, 150, 160, 163, 164

(56) References Cited

U.S. PATENT DOCUMENTS

| 3,101,926 | A | * | 8/1963 | Weber | 415/163 |
|---|---|---|---|---|---|
| 4,770,603 | A | * | 9/1988 | Engels et al. | 415/164 |
| 4,955,788 | A | * | 9/1990 | Kimura et al. | 415/150 |
| 5,996,347 | A | * | 12/1999 | Nagae et al. | 60/602 |
| 6,067,798 | A | * | 5/2000 | Okada et al. | 60/602 |
| 6,089,018 | A | * | 7/2000 | Bischoff et al. | 60/602 |
| 6,209,324 | B1 | * | 4/2001 | Daudel et al. | 60/602 |
| 6,256,991 | B1 | * | 7/2001 | Schmidt et al. | 60/602 |
| 6,269,642 | B1 | * | 8/2001 | Arnold et al. | 60/602 |
| 6,269,643 | B1 | * | 8/2001 | Schmidt et al. | 60/602 |
| 6,314,736 | B1 | * | 11/2001 | Daudel et al. | 60/602 |
| 6,314,737 | B1 | * | 11/2001 | Springer et al. | 60/602 |
| 6,318,084 | B1 | * | 11/2001 | Schmidt et al. | 60/602 |
| 6,378,305 | B1 | * | 4/2002 | Sumser et al. | 60/602 |

FOREIGN PATENT DOCUMENTS

| CH | 637734 | * | 8/1980 | 415/163 |
|---|---|---|---|---|
| DE | 3900495 | | 10/1989 | |
| DE | 29710511 | | 5/1997 | |
| DE | 19727141 | | 6/1997 | 60/602 |
| EP | 19757533 | | 10/1997 | |
| GB | 2 217 790 A | * | 11/1989 | 415/159 |
| JP | 406074140 A | * | 3/1994 | 415/159 |

* cited by examiner

Primary Examiner—Thomas Denion
Assistant Examiner—Thai-Ba Trieu
(74) Attorney, Agent, or Firm—Crowell & Moring LLP

(57) ABSTRACT

An exhaust-gas turbocharger for an internal combustion engine has a turbine having a variable turbine geometry for the variable setting of the effective flow inlet cross section to the turbine wheel. The exhaust-gas turbocharger has a compressor which is connected to the turbine via a shaft. The variable turbine geometry can be adjusted by means of a regulating device between a closed position and an open position. To compensate for wear, a stop limiting an end position of the variable turbine geometry is provided, and the position of this stop can be set in a variable manner.

16 Claims, 3 Drawing Sheets

EXHAUST-GAS TURBOCHARGER FOR AN INTERNAL COMBUSTION ENGINE AND METHOD OF OPERATING AN EXHAUST-GAS TURBOCHARGER

BACKGROUND AND SUMMARY OF THE INVENTION

This application claims the priority of German Patent Document 100 35 762.8, filed in Germany, Jul. 22, 2000, the disclosure of which is expressly incorporated by reference herein.

The invention relates to an exhaust-gas turbocharger for an internal combustion engine and a method of operating an exhaust-gas turbocharger. Preferred embodiments of the invention relate to an exhaust-gas turbocharger for an internal combustion engine, having an exhaust-gas turbine which is provided with variable turbine geometry for variable setting of an effective flow inlet cross section to a turbine wheel, and having a compressor which is connected to the exhaust-gas turbine via a shaft, the variable turbine geometry being adjustable by a regulating device between a closed position reducing the flow inlet cross section and an open position widening the flow inlet cross section.

Preferred embodiments of the invention also relate to a method of operating an exhaust-gas turbocharger for an internal combustion engine which is provided with a variable turbine geometry which can be set in a variable manner and can be adjusted as a function of characteristic quantities of the exhaust-gas turbocharger and/or of the internal combustion engine between a closed position reducing a flow inlet cross section to the turbine wheel and an open position widening the flow inlet cross section.

Described in German Patent Publication DE 197 27 141 C1 is a supercharged internal combustion engine having an exhaust-gas turbocharger which is provided with variable turbine geometry for the variable setting of the effective flow inlet cross section to the turbine wheel. By the adjustment of the variable turbine geometry, the exhaust-gas backpressure in the piping between cylinder outlet of the internal combustion engine and turbine inlet can be influenced and the power requirement of the turbine and also the compressor output and therefore also the charge pressure can be set in a variable manner. The variable turbine geometry consists of a guide cascade ring having adjustable guide blades which can be adjusted between a closed position with minimum flow inlet cross section and an open position with maximum flow inlet cross section. As a function of the state of the internal combustion engine, the guide blades are adjusted by means of an actuator in such a way that the desired charge pressure and the desired exhaust-gas backpressure are set.

Such turbochargers with variable turbine geometry can also be used in engine braking operation. In engine braking operation, the guide cascade is shifted into the closed position, in which the flow inlet cross section to the turbine wheel is markedly reduced, whereupon an increased exhaust-gas backpressure builds up in the piping section between cylinder outlet and turbine inlet, this increased exhaust-gas backpressure causing exhaust gas to flow at high velocity through the open flow passages between the guide blades and act upon the turbine wheel with a high impulse. An increased charge pressure is thereupon produced on the intake side, and the air compressed in the cylinders is released into the exhaust-gas line via braking valves. In engine braking operation, therefore, the piston, in the compression and exhaust stroke, must perform compression work against the high exhaust-gas backpressure in the exhaust-gas line.

In such exhaust-gas turbochargers, wear may occur in particular after a prolonged operating period, and this wear may result in the desired closed position of the guide cascade no longer being reached, with the result that the desired level of the exhaust-gas backpressure and of the charge pressure is no longer reached. In engine braking operation, the maximum engine braking power can then no longer be achieved.

An object of the invention is to solve the problem of compensating for wear in exhaust-gas turbochargers having variable turbine geometry with simple measures.

According to certain preferred embodiments of the invention this problem is solved by providing an exhaust-gas turbocharger for an internal combustion engine, having an exhaust-gas turbine which is provided with variable turbine geometry for variable setting of an effective flow inlet cross section to a turbine wheel, and having a compressor which is connected to the exhaust-gas turbine via a shaft, the variable turbine geometry being adjustable by a regulating device between a closed position reducing the flow inlet cross section and an open position widening the flow inlet cross section, wherein a variable stop limiting an end position of the variable turbine geometry is provided, and wherein the position of the stop can be set in a variable manner.

According to certain preferred embodiments of the invention this problem is solved by providing a method of operating an exhaust-gas turbocharger for an internal combustion engine which is provided with a variable turbine geometry which can be set in a variable manner and can be adjusted as a function of characteristic quantities of the exhaust-gas turbocharger and/or of the internal combustion engine between a closed position reducing a flow inlet cross section to the turbine wheel and an open position widening the flow inlet cross section, wherein at least one of the closed and opened positions of the turbine geometry is set in a variable manner as a function of the characteristic quantities.

According to the invention, a stop is provided in the exhaust-gas turbocharger having variable turbine geometry, this stop limiting an end position of the variable turbine geometry, it being possible for the position of the stop to be set in a variable manner. Via the setting of the stop position, in particular the end closed position, but if need be also the end open position, of the variable turbine geometry can be reset and limited to a desired value. If the variable turbine geometry can no longer reach, for example, the desired closed position on account of wear and the turbine geometry remains in an open state, a new end position for the variable turbine geometry can be preset by varying the position of the closing stop, in which end position the turbine geometry can again assume the desired position. In this way, in particular wear-related play in the joints and bearing arrangements of the turbine geometry can be compensated for.

The closing stop may be provided either directly on a component of the turbine geometry or else on a regulating device, via which the variable turbine geometry can be adjusted between the open and closed positions.

In an expedient development of certain preferred embodiments of the invention, a measuring device is provided for measuring a characteristic quantity which characterizes the behavior of the turbine, the characteristic quantity being used as a measure of the requisite adjustment of the closing stop and/or opening stop. The characteristic quantity measured may be, for example, the charge pressure in the closed position of the variable turbine geometry. The stop is then adjusted until the measured characteristic quantity coincides with a predetermined desired value which must be obtained in the relevant position of the turbine geometry. The measurement and setting are advantageously carried out in engine braking operation. However, it is also advantageous to carry out the measurement and setting in the fired drive operating mode according to certain contemplated preferred embodiments of the invention.

In addition to the closing stop limiting the closed position, an opening stop limiting the open position is also advantageously provided in certain preferred embodiments of the invention. It is then possible for this opening stop to be adjusted like the closing stop in a corresponding manner, so that both end positions of the variable turbine geometry can be set in a variable manner. The opening stop is intended in particular to ensure that, when using a guide cascade ring having adjustable guide blades, the maximum open position of the guide blades is limited in order to ensure that the blade edges maintain a sufficiently large distance from the turbine wheel in the open position.

In preferred embodiments of the method according to the invention for operating the exhaust-gas turbocharger having variable turbine geometry, the end positions of the turbine geometry are set in a variable manner as a function of measured characteristic quantities of the supercharger or of the internal combustion engine. In this case, the setting, if desired, may be effected automatically by appropriate actuating elements which are acted upon by a control device in which actuating signals acting upon the actuating elements are produced as a function of the measured variables, which are processed according to a predetermined relationship.

In order to be able to introduce compensating measures even before damage occurs or before the supercharger effect decreases, it is expedient according to certain preferred embodiments of the invention to determine a wear factor which corresponds to the number of actuations of the variable turbine geometry. In this case, the actions of the movement of the variable turbine geometry, the blade movements in the case of a guide cascade having adjustable guide blades, in the various operating states of the internal combustion engine, namely fired drive operating mode and engine braking operation, are continuously counted and used as an indication of the current wear state. If the wear factor reaches a certain value, either one or both end positions of the turbine geometry can be reset automatically or the resetting is effected during a maintenance interval. The wear factor is advantageously stored in a control device or indicated in an indicating device.

Other objects, advantages and novel features of the present invention will become apparent from the following detailed description of the invention when considered in conjunction with the accompanying drawings.

DETAILED DESCRIPTION OF THE DRAWINGS

Figure 1:
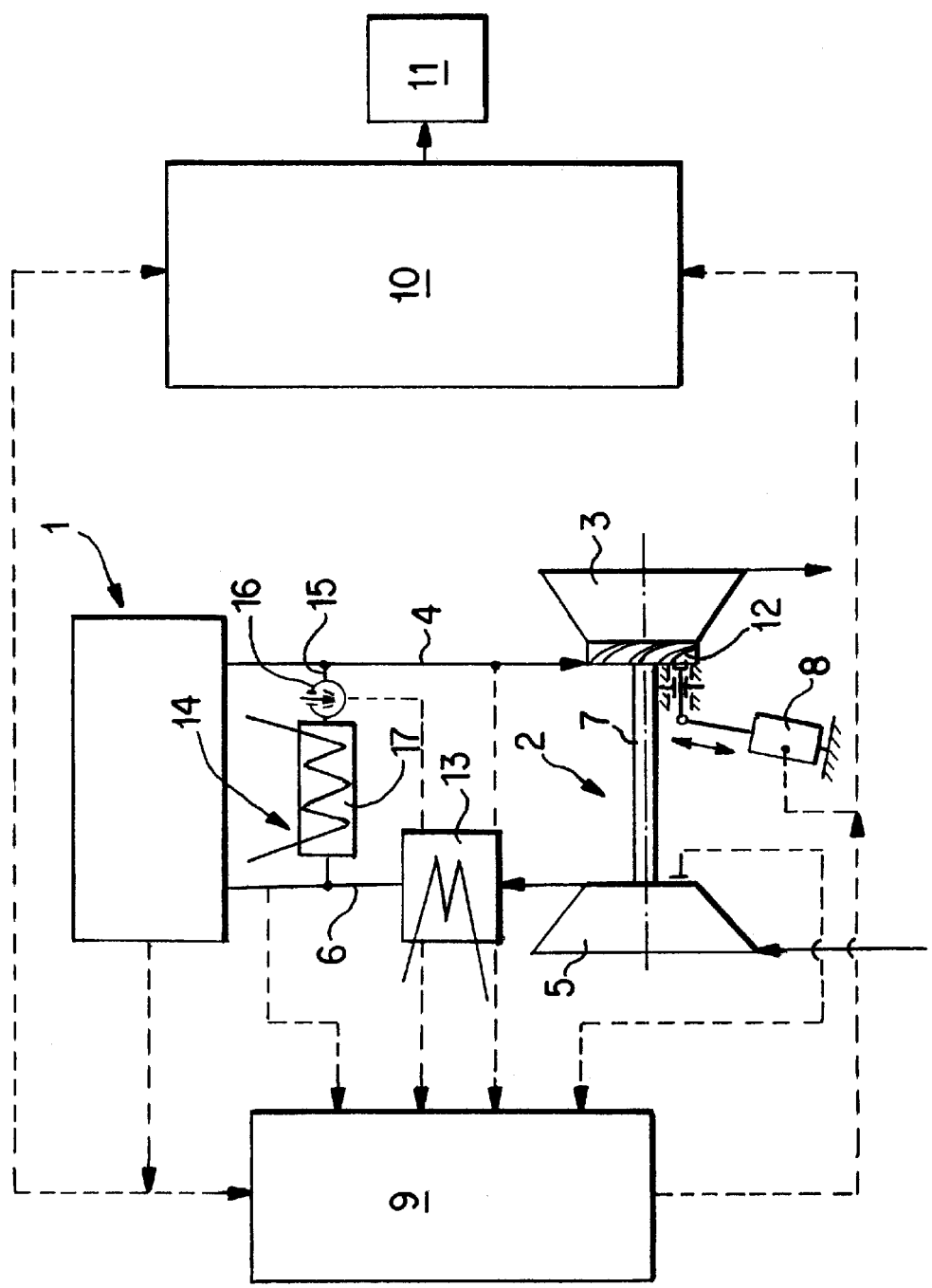
FIG. 1 shows a schematic representation of an internal combustion engine with exhaust-gas turbocharger with variable turbine geometry constructed according to a preferred embodiment of the invention, having a counting and analyzing unit in which the number of actuations of the turbine geometry is determined and processed.

Assigned to the internal combustion engine 1 shown in FIG. 1 is an exhaust-gas turbocharger 2 which comprises a turbine 3 arranged in an exhaust-gas line 4 and a compressor 5 arranged in an intake duct 6, the turbine 3 and compressor 5 being connected to one another via a shaft 7. The turbine 3 in the exhaust-gas line 4 is provided with a variable turbine geometry 12 for the variable setting of the effective turbine flow inlet cross section. The variable turbine geometry 12 can be set via a regulating device 8.

A charge-air cooler 13 is arranged in the intake duct 6 downstream of the compressor 5.

Furthermore, an exhaust-gas recycling arrangement 14, comprising a recycling line 15 in which a shut-off valve 16 and a cooler 17 are arranged, is provided between exhaust-gas line 4 and intake duct 6.

The adjustable units of the internal combustion engine can receive control or actuating signals via a control unit 9 as a function of state variables or characteristic quantities of the internal combustion engine and/or of the units. These units include, in particular, the regulating device 8 of the variable turbine geometry 12 and the shut-off valve 16 of the exhaust-gas recycling arrangement 14.

The turbine 3 with the variable turbine geometry 12 can be used both in the fired drive operating mode and during engine braking operation. To produce high drive power, the variable turbine geometry, in the fired drive operating mode, can be set to a guide cascade position in which the effective turbine flow inlet cross section assumes an optimum for the current operating point, so that a high turbine output is produced and accordingly a high charge pressure is also generated and supplied to the internal combustion engine. During engine braking operation, however, the variable turbine geometry 12 is shifted into its closed position, in which the effective turbine flow inlet cross section assumes a minimum and therefore the exhaust-gas backpressure in the line section upstream of the turbine 3 increases to a maximum. At the same time, exhaust gas flows through the remaining passages between the shut-off elements of the variable turbine geometry and acts upon the turbine wheel with a high impulse, whereupon a comparatively high charge pressure is produced via the compressor. In this way, a high pressure level overall is produced. The cylinders in the engine must accordingly perform considerable exhaust work against the exhaust-gas backpressure in the exhaust-gas line 4, as a result of which high engine braking power is achieved.

As can also be seen from FIG. 1, the internal combustion engine is provided with a counting and analyzing unit 10, which communicates with both the control unit 9 and the regulating device 8 for adjusting the variable turbine geometry 12. The actuations of the variable turbine geometry 12 via the associated regulating device 8 are counted and analyzed according to predetermined criteria in the counting and analyzing unit 10. In this case, the counting mode may be restricted to certain operating modes of the internal combustion engine, for example solely to the fired drive operating mode or solely to the engine braking operation.

A wear factor which can be used as a measure of the current wear state of the current turbine geometry can be determined in the counting and analyzing unit 10. The wear factor or the measures to be derived therefrom are either stored or else displayed in an indicating unit 11. The measures to be implemented can be carried out either automatically by appropriate actuating elements in the turbine 3 or the variable turbine geometry 12 or else during regular maintenance intervals.

Figure 2:
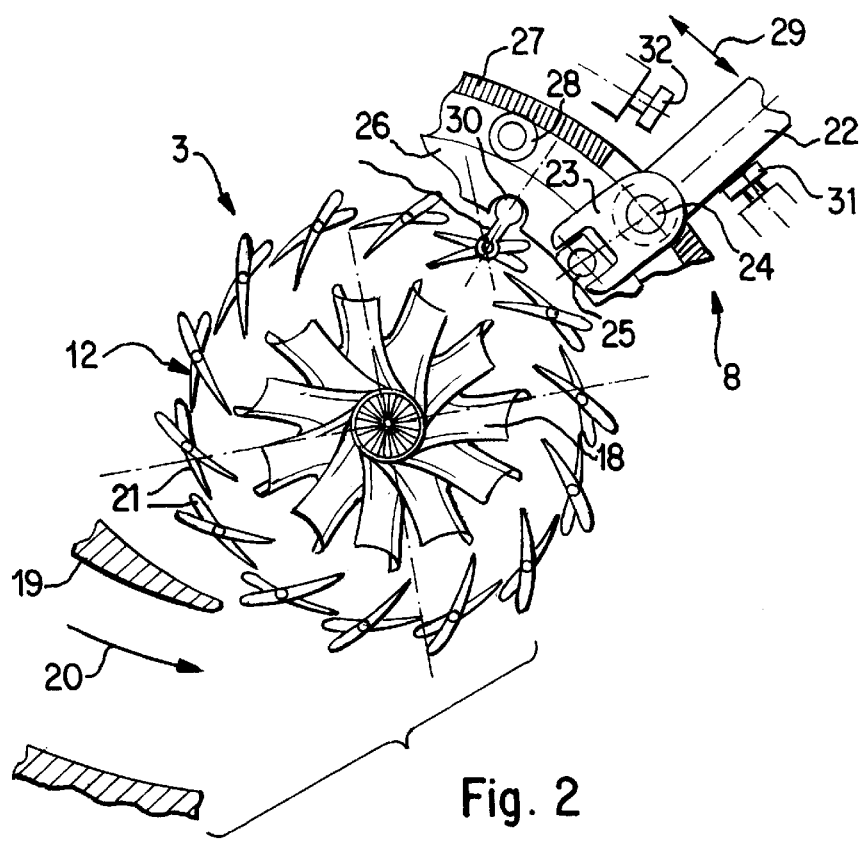
FIG. 2 shows a view of a turbine wheel in a turbine, having a variable turbine geometry which is designed as a radial guide cascade with adjustable blades and can be adjusted between closed position and open position via a regulating device which is movable between two stops, in accordance with preferred embodiments of the invention.

The turbine 3 shown in FIG. 2 and having the turbine wheel 18 has an inflow passage 19, via which exhaust gas is fed to the turbine wheel 18 from the exhaust-gas line of the internal combustion engine in arrow direction 20. Located in the flow inlet cross section between inflow passage 19 and turbine wheel 18 is the variable turbine geometry 12, which in the exemplary embodiment is designed as a radial guide cascade having adjustable guide blades 21 which radially enclose the turbine wheel 18. The guide blades 21 are each mounted so as to be pivotable independently of one another and can be adjusted between a closed position, in which the flow inlet cross section assumes a minimum, and an open position, in which the flow inlet cross section assumes a maximum. The guide blades 21 are adjusted by means of the regulating device 8. This regulating device 8 comprises a first lever 22, which can be adjusted in arrow direction 29 by an actuator (not shown), a second lever 23, which is connected to the first lever 22 via a pivot pin 24, and an adjusting ring 26, which is connected to the levers 22 and 23 via the sliding block 25 and acts upon the variable geometry 12 via a bearing 30. The adjusting ring 26, via rollers 28, is supported in a rotating manner on a casing ring 27, which is firmly connected to the turbine casing.

Provided for limiting the regulating movement of the first lever 22 are two stops 31 and 32, of which a first stop 31 constitutes a closing stop and the second stop constitutes an opening stop for limiting the regulating movement of the lever 22. The closing stop 31 corresponds to the closed position of the variable turbine geometry 12, and accordingly the opening stop 32 represents the open position of the variable geometry. Both the closing stop 31 and the opening stop 32, which both preferably assume the form of plungers, can be adjusted, as a result of which the corresponding end positions of the variable turbine geometry can also be varied. The stops 31 and 32 are to be actuated hydraulically, for example, and can be moved automatically into new positions in order to correct play caused by wear, or to correct incorrect positions of the variable turbine geometry which are caused by wear, and in particular in order to shift the closed position, but if need be also the open position, of the variable turbine geometry into predetermined desired positions.

As an alternative to automatic setting of the closed and open positions of the stops 31 and 32, respectively, manual setting may also be appropriate.

The automatic setting of the stops 31 and 32 is advantageously effected by measuring a characteristic quantity of the internal combustion engine or of the exhaust-gas turbocharger in quite specific states of the internal combustion engine, in particular the charge pressure, the closed position and also, if need be, the open position being regarded as reached if the measured characteristic quantity corresponds to a known desired value.

Figure 3:
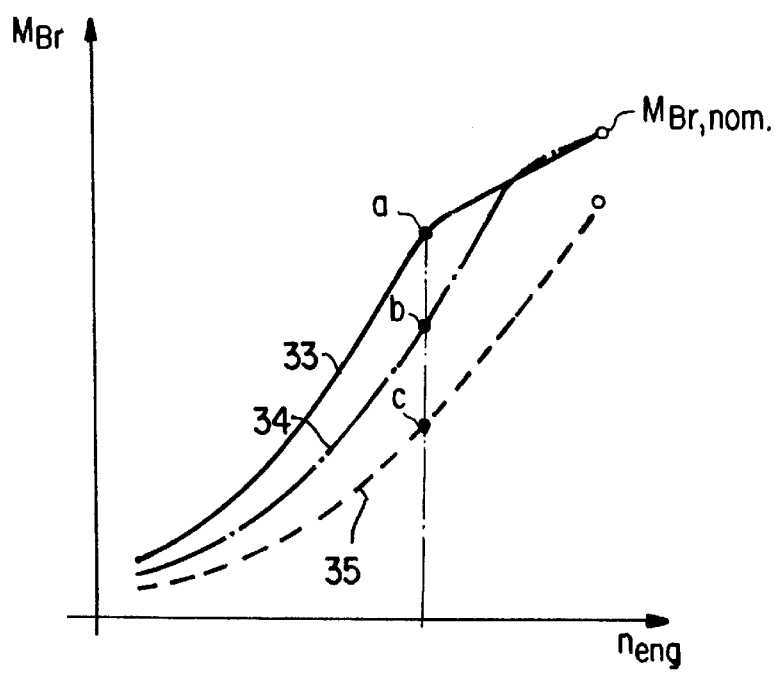
FIG. 3 shows a graph with the profile of the engine braking power as a function of the wear of the variable turbine geometry plotted against the engine speed.

Various characteristic curves with the profile of the engine braking power $M_{Br}$ as a function of the engine speed $n_{eng}$ are shown in the graph according to FIG. 3. A first engine-braking-torque characteristic curve 33, depicted by a solid line, identifies a wear-free state of the variable turbine geometry, in which state the maximum braking effect with a nominal braking torque $M_{Br, nom}$ can be achieved. As a result of wear, the engine braking torque $M_{Br}$ may decrease, so that only the characteristic curves 34 (depicted by chain-dotted line) and 35 (depicted by broken line) which run below the optimum characteristic curve 33 can be achieved. The decrease in the engine braking torque is due to the fact that the variable turbine geometry, on account of wear, play or the like, can no longer assume its optimum closed position, so that a larger exhaust-gas mass flow can pass the turbine and accordingly the pressure gradient across the turbine is smaller than in the optimum case.

Shown by way of example in FIG. 3 are three points a, b and c which each lie at the same engine speed $n_{eng}$ on the characteristic curves 33, 34 and 35, respectively. In order to improve the profile of the engine braking torque $M_{Br}$, for example from point c on the characteristic curve 35 up to the optimum, point a on the characteristic curve 33, the closing stop 31 depicted in FIG. 2 is adjusted in such a way that the variable turbine geometry can again assume its optimum closed position.

Figure 4:
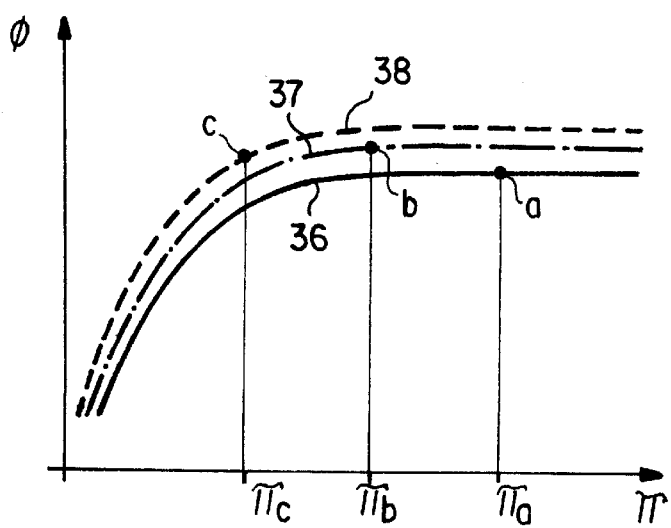
FIG. 4 shows a diagram representing the turbine flow-rate capacity for various wear states of the variable turbine geometry plotted against the turbine pressure ratio.

FIG. 4 shows the profile of a plurality of characteristic curves 36 to 38 of the turbine flow-rate capacity $\phi$ as a function of the turbine pressure ratio n, which is characterized by the ratio of turbine inlet pressure (exhaust-gas backpressure) and turbine outlet pressure. The characteristic curve 36 shown by a solid line corresponds to the optimum, wear-free profile and corresponds to the characteristic curve 33 from FIG. 3. Since the variable turbine geometry, in the wear-free state, is able to assume its optimum closed position, the turbine flow-rate capacity $\phi$ is lowest for the characteristic curve 36; a high turbine pressure ratio $\pi$ can build up over the turbine, and accordingly the point a is reached at a relatively high pressure ratio na. The characteristic curves 37 and 38, which correspond to the engine braking profile 34 and 35 from FIG. 3 and in which corresponding points b and c are depicted, run above the ideal characteristic curve 36, since these characteristic curves constitute poorer profiles of the turbine flow-rate capacity $\phi$ compared with the ideal characteristic curve 36. Accordingly, point b lies on the average characteristic curve 37 at a turbine pressure ratio $\pi_b$ which is lower than the pressure ratio $\pi_a$ of the ideal point a. Point c on the poorest characteristic curve 38 corresponds to a turbine pressure ratio $\pi_c$, which is poorer than the average pressure ratio $\pi_b$.

Figure 5:
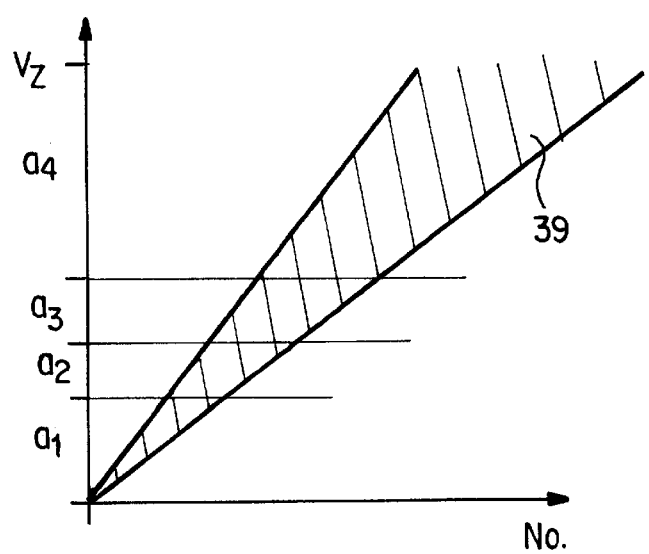
FIG. 5 shows a graph with a scatter band for a wear factor $V_2$, which identifies the wear state of the variable turbine geometry, plotted against the number of movements of the variable turbine geometry.

Depicted in the graph according to FIG. 5 is a scatter band 39 which represents a scatter range for wear factors $V_Z$ as a function of the number of guide-cascade motion actions of the variable turbine geometry. The wear factor $V_Z$ is determined by the actual number No of the guide-cascade movements being measured and if need be standardized or by it being converted to the wear factor $V_Z$ via another function. For example, the wear at various locations within the variable turbine geometry can enter the wear factor $V_Z$ in a weighted manner. Various measures may be taken depending on the level of the wear factor $V_Z$. Thus it is possible, for example, to first of all take no measure within a lower range $a_1$ of the wear factor $V_Z$, since, within this range, the wear and incorrect positions of the variable geometry which are caused by this are still within a tolerable range. Within the following range $a_2$, the closing stop, as a correction, can be adjusted in such a way that the optimum closed position of the variable turbine geometry is restored. Within the range $a_3$ which follows next, a further correction is expediently carried out to the effect that the opening stop is now also adjusted, so that the variable turbine geometry can assume its optimum open position again.

The exchange of diverse components of the turbine may be specified within a further range $a_4$. If the level of the range $a_4$ is exceeded, complete exchange of the exhaust-gas turbocharger may be appropriate.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. An exhaust-gas turbocharger for an internal combustion engine, having an exhaust-gas turbine which is provided with variable turbine geometry for variable setting of an effective flow inlet cross section to a turbine wheel, and having a compressor which is connected to the exhaust-gas turbine via a shaft, the variable turbine geometry being adjustable by a regulating device between a closed position reducing the flow inlet cross section and an open position widening the flow inlet cross section,
   wherein a variable stop limiting an end position of the variable turbine geometry is provided, and wherein the position of the stop is set in a variable manner,
   wherein a measuring device for measuring a characteristic quantity characterizing the behavior of the turbine is provided, and
   wherein the stop is adjusted in such a way that the characteristic quantity of the turbine corresponds to a predetermined desired value.

2. The exhaust-gas turbocharger according to claim 1, wherein the variable turbine geometry is designed as a guide cascade having rotatable guide blades which are actuated by the regulating device.

3. The exhaust-gas turbocharger according to claim 1, wherein the regulating device comprises a regulating lever, acting directly upon the variable turbine geometry, and a lever actuator.

4. The exhaust-gas turbocharger according to claim 1, wherein the variable stop is a closing stop limiting the closed position.

5. The exhaust-gas turbocharger according to claim 1, wherein the variable stop is an opening stop limiting the open position.

6. An exhaust-gas turbocharger for an internal combustion engine, having an exhaust-gas turbine which is provided with variable turbine geometry for variable setting of an effective flow inlet cross section to a turbine wheel, and having a compressor which is connected to the exhaust-gas turbine via a shaft, the variable turbine geometry being adjustable by a regulating device between a closed position reducing the flow inlet cross section and an open position widening the flow inlet cross section,
   wherein a variable stop limiting an end position of the variable turbine geometry is provided, and wherein the position of the stop is set in a variable manner,
   wherein the stop is arranged in a regulating path of a regulating device of the variable turbine geometry,
   wherein a measuring device for measuring a characteristic quantity characterizing the behavior of the turbine is provided, and
   wherein the stop is adjusted in such a way that the characteristic quantity of the turbine corresponds to a predetermined desired value.

7. The exhaust-gas turbocharger according to claim 6, wherein the variable turbine geometry is designed as a guide cascade having rotatable guide blades which are actuated by the regulating device.

8. The exhaust-gas turbocharger according to claim 6, wherein the regulating device comprises a regulating lever, acting directly upon the variable turbine geometry, and a lever actuator.

9. The exhaust-gas turbocharger according to claim 6, wherein the variable stop is a closing stop limiting the closed position.

10. The exhaust-gas turbocharger according to claim 6, wherein the variable stop is an opening stop limiting the open position.

11. An exhaust-gas turbocharger for an internal combustion engine, having an exhaust-gas turbine which is provided with variable turbine geometry for variable setting of an effective flow inlet cross section to a turbine wheel, and having a compressor which is connected to the exhaust-gas turbine via a shaft, the variable turbine geometry being adjustable by a regulating device between a closed position reducing the flow inlet cross section and an open position widening the flow inlet cross section,
   wherein a variable stop limiting an end position of the variable turbine geometry is provided, and wherein the position of the stop is set in a variable manner, and
   wherein the variable stop is an opening stop limiting the open position.

12. An exhaust-gas turbocharger for an internal combustion engine, having an exhaust-gas turbine which is provided with variable turbine geometry for variable setting of an effective flow inlet cross section to a turbine wheel, and having a compressor which is connected to the exhaust-gas turbine via a shaft, the variable turbine geometry being adjustable by a regulating device between a closed position reducing the flow inlet cross section and an open position widening the flow inlet cross section,
   wherein a variable stop limiting an end position of the variable turbine geometry is provided, and wherein the position of the stop is set in a variable manner,
   wherein the stop is arranged in a regulating path of a regulating device of the variable turbine geometry, and
   wherein the variable stop is an opening stop limiting the open position.

13. A method of operating an exhaust-gas turbocharger for an internal combustion engine which is provided with a variable turbine geometry which is set in a variable manner and/is adjusted as a function of characteristic quantities of at least one of the exhaust-gas turbocharger and the internal combustion engine between a closed position reducing a flow inlet cross section to the turbine wheel and an open position widening the flow inlet cross section,
   wherein at least one of the closed and opened positions of the turbine geometry is set in a variable manner as a function of the characteristic quantities, and
   wherein the number of actuations of the variable turbine geometry is determined when the internal combustion engine is running.

14. A method of operating an exhaust-gas turbocharger for an internal combustion engine which is provided with a variable turbine geometry which is set in a variable manner and/is adjusted as a function of characteristic quantities of at least one of the exhaust-gas turbocharger and the internal combustion engine between a closed position reducing a flow inlet cross section to the turbine wheel and an open position widening the flow inlet cross section, wherein at least one of the closed and opened positions of the turbine geometry is set in a variable manner as a function of the characteristic quantities, wherein the at least one end position of the turbine geometry is adjusted in such a way that the characteristic quantity corresponds to a predetermined desired value in the closed position of the variable turbine geometry, and wherein the number of actuations of the variable turbine geometry is determined when the internal combustion engine is running.

15. A method of operating an exhaust-gas turbocharger for an internal combustion engine which is provided with a variable turbine geometry which is set in a variable manner and/is adjusted as a function of characteristic quantities of at least one of the exhaust-gas turbocharger and the internal combustion engine between a closed position reducing a flow inlet cross section to the turbine wheel and an open position widening the flow inlet cross section, wherein at least one of the closed and opened positions of the turbine geometry is set in a variable manner as a function of the characteristic quantities, wherein both end positions are adjusted in a similar regulating direction, and wherein the number of actuations of the variable turbine geometry is determined when the internal combustion engine is running.

16. A method of operating an exhaust-gas turbocharger for an internal combustion engine which is provided with a variable turbine geometry which is set in a variable manner and/is adjusted as a function of characteristic quantities of at least one of the exhaust-gas turbocharger and the internal combustion engine between a closed position reducing a flow inlet cross section to the turbine wheel and an open position widening the flow inlet cross section, wherein at least one of the closed and opened positions of the turbine geometry is set in a variable manner as a function of the characteristic quantities, wherein the charge pressure is used as a characteristic quantity, and wherein the number of actuations of the variable turbine geometry is determined when the internal combustion engine is running.

* * * * *